(12) United States Patent
Ikeda et al.

(10) Patent No.: US 8,835,585 B2
(45) Date of Patent: Sep. 16, 2014

(54) COPOLYMER AND CEMENT DISPERSANT INCLUDING THE COPOLYMER

(75) Inventors: Akira Ikeda, Sodegaura (JP); Akira Suga, Sodegaura (JP); Satoshi Kobayashi, Sodegaura (JP)

(73) Assignee: Toho Chemical Industry Co., Ltd., Tokyo (JP)

( * ) Notice: Subject to any disclaimer, the term of this patent is extended or adjusted under 35 U.S.C. 154(b) by 43 days.

(21) Appl. No.: 13/638,361

(22) PCT Filed: Mar. 31, 2011

(86) PCT No.: PCT/JP2011/058278
§ 371 (c)(1),
(2), (4) Date: Sep. 28, 2012

(87) PCT Pub. No.: WO2011/125869
PCT Pub. Date: Oct. 13, 2011

(65) Prior Publication Data
US 2013/0018162 A1    Jan. 17, 2013

(30) Foreign Application Priority Data
Mar. 31, 2010  (JP) ................................. 2010-084638

(51) Int. Cl.
| | | |
|---|---|---|
| *C08F 220/28* | (2006.01) | |
| *C08G 65/34* | (2006.01) | |
| *C08G 69/00* | (2006.01) | |
| *C08F 290/06* | (2006.01) | |
| *C04B 24/26* | (2006.01) | |
| *B01F 17/00* | (2006.01) | |
| *C04B 103/40* | (2006.01) | |

(52) U.S. Cl.
CPC ....... *C04B 24/2647* (2013.01); *C04B 2103/408* (2013.01); *C08F 290/062* (2013.01); *C08F 220/28* (2013.01); *B01F 17/0028* (2013.01)
USPC .................. 526/318.42; 526/317.1; 528/332; 528/361

(58) Field of Classification Search
CPC ........ C08F 220/28; C08G 65/34; C08G 69/00
USPC ................... 526/317.1, 318.42; 528/332, 361
See application file for complete search history.

(56) References Cited

FOREIGN PATENT DOCUMENTS

| | | | |
|---|---|---|---|
| JP | B2-59-18338 | | 4/1984 |
| JP | 07172891 A | * | 7/1995 |
| JP | A-7-172891 | | 7/1995 |
| JP | A-9-86990 | | 3/1997 |
| JP | A-11-246250 | | 9/1999 |
| JP | A-2003-286057 | | 10/2003 |
| JP | A-2005-281022 | | 10/2005 |
| JP | A-2009-155457 | | 7/2009 |
| JP | 2009242197 A | * | 10/2009 |
| JP | A-2009-242197 | | 10/2009 |
| WO | WO 03091180 A1 | * | 11/2003 |

OTHER PUBLICATIONS

Ronbunshu, "Polymethacrylic Acid-Polyethylene Glycol Graft Copolymer as Base Material in High-Range AW Water Reducing Agent for Concrete," *Japanese Journal of Polymer Science and Technology*, vol. 65, No. 11, Nov. 2008, pp. 659-669.
International Search Report issued in International Patent Application No. PCT/JP2011/058278 dated May 10, 2011.
International Preliminary Report on Patentability issued in International Patent Application No. PCT/JP2011/058278 dated Nov. 13, 2012.

* cited by examiner

*Primary Examiner* — Michael M Bernshteyn
(74) *Attorney, Agent, or Firm* — Oliff PLC

(57) ABSTRACT

A cement dispersant that includes a copolymer resulting from a reaction of components (A) to (C), where: (A) is an ester compound obtained by adding 0 to 10 moles of $C_{2-4}$ alkylene oxide to 1 mole of at least one compound of Formula (1) RO-(AO)n-H (where R is a $C_{1-12}$ alkyl group, A is a $C_{2-4}$ alkylene group, and n is an integer of 0 to 7) and subjecting the resulting adduct to a reaction with an $\alpha,\beta$-unsaturated carboxylic acid, in which the compound of Formula (1) contains not more than 5% by mass of the constituent compounds having n of 3 or less relative to the total mass of the compound of Formula (1); (B) is an $\alpha,\beta$-unsaturated carboxylic acid or a salt thereof; and (C) is another copolymerizable monomer, where appropriate, or a salt thereof.

12 Claims, 1 Drawing Sheet

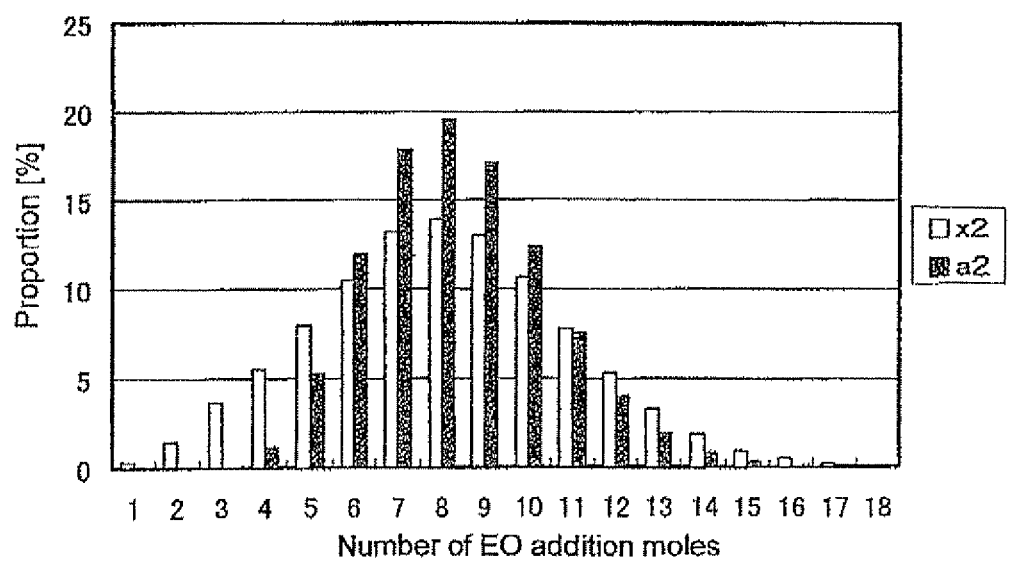

COPOLYMER AND CEMENT DISPERSANT INCLUDING THE COPOLYMER

TECHNICAL FIELD

The present invention relates to a copolymer that includes an ester compound derived from a polyalkylene glycol alkyl ether that contains a reduced proportion of polyalkylene glycol alkyl ethers having a small number of addition moles of alkylene oxide and an unsaturated carboxylic acid, or a salt of the copolymer, and a dispersant including the same. Specifically, the present invention relates to a cement dispersant that includes the copolymer and that has an excellent water-reducing ability, causes no delay in setting, achieves low viscosity of fresh concrete to allow easy kneading, and has an excellent construction workability.

BACKGROUND ART

Cement dispersants for improving concrete durability, ensuring concrete strength, and reducing the unit water content of concrete are an essential chemical admixture in today's concrete production. Among the cement dispersants, a high-range AE water reducing agent that is predominantly composed of a polycarboxylic acid polymer is excellent in an effect of reducing a unit water content, can achieve desired consistency during transportation from a manufacturing site of ready-mixed concrete to a job site to ensure excellent construction workability (high slump retention or decreased slump loss), and therefore is especially excellent in an effect of reducing construction defects. This allows concrete products factories to produce concrete products with less unit water content, resulting in increased production of high-strength precast components.

Along with the technical development in high-range AE water reducing agents, construction techniques and construction methods using the newly developed cement dispersants have been established, which has led to new problems and requirements to be overcome. Since the emergence of fundamental cement dispersants including a polycarboxylic acid polymer, such as one disclosed in Patent Document 1, in order to solve newly occurred problems and satisfy new requirements, polycarboxylic acid polymers having various molecular weights and various structures have been studied and have been developed for use in a cement dispersant.

Various suggestions have been made, including one to seek improvement in slump retention by controlling the molecular weight of the polycarboxylic acid polymer to fall within the suitable range (Patent Document 2), one to seek improvement in efficiency at the work site and in labor savings by reducing the degradation effect with time on fluidity (slump loss) and facilitating release from a formwork and early strength development in the resulting concrete by way of providing a polycarboxylic acid polymer the monomer composition of which is controlled to have a combination of monomers with different grafted side chains (the number of addition moles of ethylene oxide: 5 to 25, 40 to 109) (Patent Document 3), and one to seek exhibition of the fluidity and strength development in the resulting concrete by providing a polycarboxylic acid polymer that includes a polymer structure derived from a carboxylic acid monomer containing an alkoxy group or a hydroxyalkoxy group (Patent Document 4). Another suggestion that has been made is to provide a cement dispersant having high passability and fluidity and being able to develop the strength of the resulting concrete by controlling the molecular weight of the polycarboxylic acid polymer to be not lower than 5,000 and lower than 10,000 and the value of the weight average molecular weight/number average molecular weight to be not lower than 1.0 and not higher than 1.5 (Patent Document 5).

As described above, controlling the molecular weight and the structure of a polycarboxylic acid polymer in a cement dispersant significantly changes the work environment in the concrete production site and the construction site. Therefore, accuracy in polymerization of the polycarboxylic acid polymer has long been desired to be further improved in order to fully meet increasing needs.

Use of a polycarboxylic acid polymer recently started to cause various troubles and raise problems to be solved in the expectation for further improvement thereof. For example, it presents a challenge to reduce variation in the performance of a cement water-reducing agent due to temperature changes. This variation causes a problem that, during the winter months, the performance such as the water-reducing ability develops so slowly that the fluidity of concrete is excessive when the concrete arrives at the construction site even though the fluidity has been appropriately adjusted while kneaded in a ready-mixed concrete factory, which causes uneven placement including segregation at the time of construction, resulting in troubles such as nonuniformity in concrete strength. On the other hand, during the summer months, increased temperatures facilitate cement hydration to make it difficult to ensure the consistency for a desired period of time, and therefore a cement water-reducing agent that can achieve desired consistency to be retained for a prolonged period of time is desired.

A polycarboxylic acid polymer has a foaming property, which is less effective than that of a conventional naphthalene-based cement water-reducing agent, but nonetheless presents concerns about alteration in the air content of concrete and about the impact on the finished surface (hereinafter, called a pockmarked surface). Both of these are serious problems to be solved regarding the quality of hardened concrete because the air content of concrete is known to be associated with concrete strength and therefore a change in the air content directly involves degradation in the strength, and because the impact on the finished surface, which is subjected to neutralization and salt damage, is associated with concrete durability.

RELATED ART DOCUMENTS

Patent Documents

Patent Document 1: Japanese Examined Patent Application Publication No. 59-18338 (JP 59-18338 B)
Patent Document 2: Japanese Patent Application Publication No. 9-86990 (JP 9-86990 A)
Patent Document 3: Japanese Patent Application Publication No. 11-246250 (JP 11-246250 A)
Patent Document 4: Japanese Patent Application Publication No. 2003-286057 (JP 2003-286057 A)
Patent Document 5: Japanese Patent Application Publication No. 2005-281022 (JP 2005-281022 A)

SUMMARY OF THE INVENTION

Problem to be Solved by the Invention

An object of the present invention is to provide a novel compound having high dispersibility, in particular adequate dispersibility (a water-reducing ability, workability, and the like) for cement materials, and, as an application thereof, a novel dispersant, particularly a novel cement dispersant having an excellent water-reducing ability, causing no delay in setting, achieving low viscosity of fresh concrete to allow easy kneading, and having an excellent construction workability.

Means for Solving the Problem

The inventors of the present invention have conducted intensive research and, as a result, found that the above object can be achieved by a polyalkylene glycol alkyl ether(meth) acrylate that is a copolymer including, as a monomer component, an ester compound that contains a small proportion of the constituents having a small number of addition moles of alkylene oxide. Thus, they have now completed the present invention.

That is, the present invention relates to a copolymer resulting from a reaction of components (A) to (C):

(A) an ester compound obtained by adding 0 to 10 moles of $C_{2-4}$ alkylene oxide to 1 mole of at least one compound of Formula (1);

RO-(AO)n-H　　　　　　　　　　　　　　　　(1)

(where R is a $C_{1-12}$ alkyl group, A is a $C_{2-4}$ alkylene group, and n is an integer of 0 to 7 indicating the number of moles of alkylene oxide) and then subjecting the resulting adduct to a reaction with an α,β-unsaturated carboxylic acid, in which the compound of Formula (1) contains not more than 5% by mass of the constituent compounds having n of 3 or less relative to the total mass of the compound of Formula (1), (B) an α,β-unsaturated carboxylic acid or a salt thereof, and (C) another copolymerizable monomer, where appropriate;

or a salt thereof.

The present invention also relates to a copolymer resulting from a reaction of components (A) to (C):

(A) at least one ester compound of Formula (2);

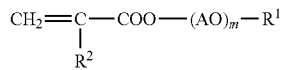

(where $R^1$ is a $C_{1-12}$ alkyl group, $R^2$ is a hydrogen atom or a methyl group, A is a $C_{2-4}$ alkylene group, and m is an integer of 0 to 15 indicating the number of addition moles of alkylene oxide) in which the compound contains not more than 5% by mass of the constituent compounds having m of 3 or less relative to the total mass of the compound, and m is 4.0 to 8.5 on average, (B) an α,β-unsaturated carboxylic acid or a salt thereof, and (C) another copolymerizable monomer, where appropriate;

or a salt thereof.

In the copolymer and a salt thereof, the ratio of the components (A) to (C) involved in copolymerization is preferably (A):(B):(C)=50 to 95:5 to 50:0 to 40 by mass.

The present invention also relates to a dispersant including the copolymer or a salt thereof.

The present invention further relates to a cement dispersant including the copolymer or a salt thereof.

Effects of the Invention

The present invention can provide a cement dispersant that is excellent in construction workability, namely having an excellent water-reducing ability, causing less delay in setting, achieving low concrete viscosity right after discharge and after a certain period of time, and the like, and is less temperature dependent, and a copolymer or a salt thereof suitably included in the cement dispersant.

The present invention can also provide a cement dispersant that can form concrete that is excellent in the surface appearance with a mere pockmark after hardened, and a copolymer or a salt thereof suitably included in the cement dispersant.

BRIEF DESCRIPTION OF THE DRAWINGS

FIG. 1 indicates a distribution of the number of addition moles of ethylene oxide in polyethylene glycol monomethyl ether a2 in Synthesis Example 2 and polyethylene glycol monomethyl ether x2 in Comparative Synthesis Example.

MODES FOR CARRYING OUT THE INVENTION

The present invention has a significant feature to include, as a component of a copolymer, an ester compound derived from a polyalkylene glycol alkyl ether that contains a reduced proportion of polyalkylene glycol alkyl ethers having 3 moles or less of alkylene oxide and an α,β-unsaturated carboxylic acid.

The inventors of the present invention conducted various studies on the structure of a copolymer useful as a cement dispersant, the species, the proportion, and the molecular weight of the monomer constituting the copolymer, and the like and, as a result, found that improvement in the performance of a cement dispersant is significantly affected by controlling the distribution of the number of addition moles of alkylene oxide in an ester compound of a polyalkylene glycol alkyl ether useful as a component of the copolymer.

The following has been reported on a relation between the structure of a polycarboxylic acid polymer, in particular a polyalkylene glycol alkyl ether constituting the polymer, in a cement dispersant and various concrete performance such as concrete viscosity, the amount of air entrainment, and temperature dependence.

For example, Patent Document 5 and the like, which aim at achieving lower viscosity of concrete, use methoxypolyoxyethylene methacrylate with a relatively low molecular weight having 9 or 23 moles of ethylene oxide on average.

The following is also reported in the summary and the conclusion in Hirata, et al. [comprehensive paper] "Polymethacrylic acid-polyethylene glycol graft copolymer as base material in high-range AE water reducing agent for concrete", Kobunshi Ronbunshu (Japanese Journal of Polymer Science and Technology), Vol. 65, No. 11, pp. 659-669 (November, 2008).

"A polycarboxylic acid (PC) including methoxypoly(n)ethylene glycol (PGM-n) in a side chain of polymethacrylic acid (PMAA) was studied on its optimum structure for achieving cement dispersibility. PC adsorbs cement particles with the main chain PMAA, and the side chain plays a role in cement dispersion. Adsorption of PC on cement particles was achieved only when the main chain had not less than 30 moles of carboxy group. PC having PGM-10 as its side chain showed degradation in cement dispersibility at an increased temperature. The reason was speculated that the side chain became hydrophobic in the cement paste and then adsorbed cement particles. This suggested that, in order to achieve high cement dispersibility even at high temperatures as during the summer months, the side chain of PC needs to be hydrophilic regardless of the temperature and therefore needs to have a chain length, n, of 15 or longer. In addition, it was found that the side chain length, the methacrylic acid ratio, and the Mw of PC should be in a certain relation for achieving high cement dispersibility. The Mw and the molecular weight distribution of PC were studied in terms of cement dispersibility and slump retention to be obtained." (citation from [Summary])

"This report revealed the polymer structure of PC for achieving high cement dispersibility as below. (omitted)

(3) The thermal behavior of PGM-n in a cement paste or an electrolyte solution was studied by refractive index measurement to show that, when n was as small as n≤10, shrinkage occurred at a temperature of not lower than about 30° C. As the temperature was raised, association occurred, which could be observed as if the molecular weight increased. At temperatures of not lower than 45° C., PGM-n adsorbed cement particles. On the other hand, when n≥30, neither shrinkage nor association due to hydrophobicity was observed, and hydrophilicity was maintained regardless of the temperature.

(4) PC having a side chain of n≥15 showed high cement dispersibility regardless of the temperature.

(The rest was omitted)" (citation from [Conclusion])

Thus, Hirata, et al. reported in this paper that methoxypolyoxyethylene glycol having an average number, n, of moles of ethylene oxide of 10 moles caused degradation in cement dispersibility at an increased temperature and, when one having n of "as large as exceeding 10" was used, it was expected that "even at high ambient temperature as during the summer months, hydrophilicity can be maintained to achieve a high slump value, which can also be maintained." As for an air content, they reported that the amount of air entrainment was high when the average mole number, n, was very small, namely 5 moles, while the air content decreased as n increased, concluding that "n is preferably larger because a too high air content leads to low concrete strength."

Thus, according to these articles, it was common knowledge among those skilled in the art that a desirable side chain of a polycarboxylic acid for obtaining ready-mixed concrete with excellent properties and low viscosity is a long-chain polyalkylene glycol having about 30 moles of ethylene oxide on average, and that use of a polyalkylene glycol with an extremely short chain length of less than 10 moles of ethylene oxide on average, as a side chain increases hydrophobicity and causes problems such as an unfavorable air content and poor fluidity at high temperatures. Because of this, a polyalkylene glycol alkyl ether having at least 9 moles or more of ethylene oxide on average is conventionally used in general as a component of a polycarboxylic acid polymer.

Contradictory to all these conventional common knowledge, the inventors of the present invention found for the first time that even when a polycarboxylic acid polymer is predominantly composed of a polyalkylene glycol alkyl ether having a very small number of addition moles of ethylene oxide on average, appropriate control of the distribution of the number of addition moles of ethylene oxide can unexpectedly produce a cement dispersant that can solve the above problems and has excellent performance. Thus, they have completed the present invention.

Further explanation is as follows. A polyalkylene glycol alkyl ether that is a component of a polycarboxylic acid polymer is usually prepared by adding a desired amount of alkylene oxide to an alcohol. In a conventional method, the distribution of the number of addition moles of alkylene oxide in a polyalkylene glycol alkyl ether is wide, and becomes even wider as the number of addition moles of alkylene oxide increases.

In order to select polyalkylene glycol the number of addition moles of ethylene oxide of which is suitable to be used in a cement dispersant, the inventors of the present invention conducted studies on polycarboxylic acid polymers that include polyalkylene glycol the distribution of the number of addition moles of alkylene oxide of which is controlled by distillation, catalyst screening, or a similar technique. While studying various polyalkylene glycols the distribution of the number of addition moles of alkylene oxide of which is controlled, they found that, by controlling the proportion of the constituents having 3 moles or less of alkylene oxide to be not higher than 5% by weight, a polycarboxylic acid polymer that fulfills all the requirements on temperature independence, a change in air content, and concrete viscosity can be obtained. Along with this finding, it was also revealed that concrete including this polycarboxylic acid polymer can be kneaded and set in a shorter time.

Although the relation between the performance of the polycarboxylic acid polymer and the controlled polyalkylene glycol according to the present invention has not yet been sufficiently clarified, speculation is that 3 moles as the number of addition moles of alkylene oxide is the turning point between the hydrophilicity and the hydrophobicity of a polyalkylene glycol alkyl ether and, by controlling the number of addition moles of alkylene oxide to be a certain number, a cement dispersant having unexpectedly consistent properties is obtained.

The present invention will be described in detail.

<Ester Compound (A)>

The ester compound (A) derived from a polyalkylene glycol alkyl ether and an α,β-unsaturated carboxylic acid of the present invention is an ester compound obtained by adding 0 to 10 moles of $C_{2-4}$ alkylene oxide to 1 mole of at least one compound of Formula (1):

$$RO\text{-}(AO)n\text{-}H \quad (1)$$

(where R is a $C_{1-12}$ alkyl group, A is a $C_{2-4}$ alkylene group, and n is an integer of 0 to 7 indicating the number of addition moles of alkylene oxide) and then subjecting the resulting adduct to a reaction with an α,β-unsaturated carboxylic acid.

In the present invention, the compound of Formula (1) is a compound that contains a small proportion of the constituents having n of 3 or less, namely contains not more than 5% by mass of the constituent compounds having a number, n, of moles of alkylene oxide of 3 or less relative to the total mass of the compound of Formula (1).

R in Formula (1) is preferably a $C_{1-8}$ alkyl group and is more preferably a $C_{1-4}$ alkyl group. Specific examples thereof include a methyl group, an ethyl group, a propyl group, an n-butyl group, a sec-butyl group, and a tert-butyl group.

Specific examples of AO include an ethyleneoxy group, a propyleneoxy group, and a butyleneoxy group.

The compound of Formula (1) used in the present invention, namely a polyalkylene glycol alkyl ether, is a compound that contains not more than 5% by mass of the constituents having a number, n, of moles of alkylene oxide of 3 or less, in other words, a compound in which the number of addition moles of alkylene oxide is largely distributed within the range of about 4 to 6 (the number of addition moles is narrowly distributed).

In the present invention, the compound preferably contains not more than 3% by mass of the constituents having 3 moles or less of alkylene oxide and further preferably contains not more than 1% by mass of the constituents having 3 moles or less of alkylene oxide because use of a smaller proportion of polyalkylene glycol chains with a short chain length can reduce influence on the air content of concrete and influence of a temperature change during construction.

In the compound of Formula (1), the average number of addition moles of alkylene oxide is preferably 4 to 6 and is more preferably 4 to 5.

The ether compound containing a smaller proportion of polyalkylene glycol chains with a short chain length can be obtained by, for example, adding about 4 moles of $C_{2-4}$ alkylene oxide to 1 mole of $C_{1-12}$ monohydric alcohol in the presence of an alkaline catalyst, and then segregating off part of the product having 3 moles or less of alkylene oxide by distillation or a similar segregation operation.

The ether compound containing a smaller proportion of polyalkylene glycol chains with a short chain length may be directly obtained without distillation or a similar segregation operation, namely by adding an alkylene oxide to a $C_{1-12}$ monohydric alcohol in the presence of an acid catalyst or the like.

The polyalkylene glycol alkyl ether may be further added with 0 to 10 moles of $C_{2-4}$ alkylene oxide, where appropriate.

As shown in Examples (Synthesis Examples) and FIG. 1, which will be mentioned later, a compound (compound a2 in Synthesis Example 2) that is obtained by preparing a polyalkylene glycol alkyl ether that contains a reduced proportion of polyalkylene glycol alkyl ethers having 3 moles or less of alkylene oxide and then further adding an alkylene oxide to the resultant is shown to have a narrower distribution of the number of addition moles of alkylene oxide than that of a compound (compound x2 in Comparative Synthesis Example) that is obtained by adding an alkylene oxide to an alcohol in one step using an alkaline catalyst.

The ester compound (A) may be obtained by subjecting, to a reaction with an α,β-unsaturated carboxylic acid, the polyalkylene glycol alkyl ether resulting from the above method or a similar method, as it is, or a combination of plurality of polyalkylene glycol alkyl ethers having different ranges of polyalkylene glycol chain lengths.

Examples of the α,β-unsaturated carboxylic acid include the same ones as those used as (B) below, and among these, acrylic acid and methacrylic acid are preferable from the effect and economic standpoints.

The ester compound (A) of the present invention may also be at least one ester compound of Formula (2):

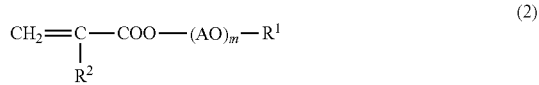

that is a compound that contains not more than 5% by mass of the constituent compounds having m of 3 or less relative to the total mass of the compound and has m of 4.0 to 8.5 on average.

In the formula, $R^1$ is a $C_{1-12}$ alkyl group, $R^2$ is a hydrogen atom or a methyl group, A is a $C_{2-4}$ alkylene group, and m is an integer of 0 to 15 indicating the number of addition moles of alkylene oxide. Preferable as $R^1$ and A are the same groups as those defined for R and A above.

<α,β-Unsaturated Carboxylic Acid or Salt Thereof (B)>

Examples of an α,β-unsaturated carboxylic acid (salt) (B) include (meth)acrylic acid, maleic acid, maleic anhydride, fumaric acid, itaconic acid, itaconic anhydride, citraconic acid, citraconic anhydride, maleic acid half esters, and fumaric acid half esters; alkali metal (such as lithium, sodium, and potassium) salts, alkaline-earth metal (such as calcium and magnesium) salts, ammonium (such as ammonium and tetraoctylammonium) salts, and organic amine (such as alkanolamines, polyalkylene polyamines, or derivatives thereof (alkylates, alkylene oxide adducts), and lower alkylamines) salts thereof; and a combination of two or more of these. Preferable among these are (meth)acrylic acid, itaconic acid, maleic acid, and fumaric acid, alkali metal salts, alkaline-earth metal salts, and ammonium salts thereof, and a combination of two or more of these.

<Another Monomer (C)>

In the present invention, in addition to the components (A) and (B), another copolymerizable monomer (C) can be used in copolymerization, where appropriate. Another copolymerizable monomer is a compound, namely a monomer, that is commonly used in a polycarboxylic acid-based cement dispersant, and may be a polyalkylene glycol monoalkenyl ether, (meth)allylsulfonic acid (salt), styrenesulfonic acid (salt), an alkyl (meth)acrylate ester, styrene, or (meth)acrylamide. Another copolymerizable monomer is not particularly limited provided that it is a monomer copolymerizable with the components (A) and (B).

The component (C) that may be used is an ester compound of a polyalkylene glycol alkyl ether that has the same structure as that of the ester compound as the component (A) except for the alkyl chain length, and the number of addition moles of alkylene oxide (the number of addition moles is 20 to 50, for example) that are different from those defined in the present invention.

Among these, examples of the polyalkylene glycol monoalkenyl ether include alkenyl ethers formed of a polyalkylene glycol and a $C_{3-8}$ alkenyl ether, and specific examples thereof include adducts of 3-methyl-3-buten-1-ol with alkylene oxide, adducts of 2-propen-1-ol (allyl alcohol) with alkylene oxide, and ethers thereof.

The copolymer of the present invention can be obtained by condensing monomers, namely a compound a; a polyalkylene polyamine, a compound b; a dibasic acid or an ester of a dibasic acid and a $C_{1-4}$ lower alcohol, and a compound c; acrylic acid, methacrylic acid, or an ester of acrylic acid or methacrylic acid and a $C_{1-4}$ lower alcohol, at a certain proportion to obtain a polyimide polyamine, and adding thereto a certain amount of a compound d; an alkylene oxide, followed by copolymerizing the resulting compound.

Non-limitative examples of the compound a; a polyalkylene polyamine include diethylenetriamine, triethylenetetramine, tetraethylenepentamine, pentaethylenehexamine, dipropylenetriamine, tripropylenetetramine, and tetrapropylenepentamine.

Examples of the compound b; a dibasic acid and a $C_{1-4}$ lower alcohol ester thereof include roalonic acid, succinic acid, fumaric acid, maleic acid, glutaric acid, adipic acid, pimelic acid, phthalic acid, azelaic acid, and sebacic acid, and esters thereof with a $C_{1-4}$ lower alcohol such as methanol, ethanol, propanol, butanol, and any isomer thereof. Among these, adipic acid is most preferable from the effect and economic standpoints.

Examples of the compound c; acrylic acid or methacrylic acid and a $C_{1-4}$ lower alcohol ester thereof include acrylic acid, methacrylic acid, methyl acrylate, methyl methacrylate, ethyl acrylate, ethyl methacrylate, propyl acrylate, propyl methacrylate, and butyl acrylate, butyl methacrylate.

The polyamide polyamine containing these three components, namely the compounds a, b, and c, can be easily obtained by a known condensation polymerization technique. The compound d; a $C_{2-4}$ alkylene oxide to be added to an amino residue of the polyamide polyamine is ethylene oxide, propylene oxide, or butylene oxide. The alkylene oxide may be used alone or as a combination of two or more of these.

Production of the polyamide polyamine, in other words a condensation polymerization reaction of the compounds a, b, and c, is carried out, for example, by a two-step reaction method of subjecting the compound a and the compound b alone to condensation polymerization, and then adding thereto a monobasic acid as the compound c, followed by continuing condensation polymerization, a one-step reaction method of mixing the compounds a, b, and c at once to perform condensation polymerization, or a similar method. All of these methods may be regarded to lead to the same result because the condensation polymerization reaction, that is an amidation reaction, proceeds along with an amide exchange reaction and therefore an acrylic acid residue or a methacrylic acid residue derived from the compound c ends up being at the terminal of a polyamide chain.

Next, the reaction molar ratio of these three components constituting the polyamide polyamine is explained. 1.0 mole of the compound a (polyalkylene polyamine) is subjected to a reaction with 0.5 to 0.95 mole of the compound b (a dibasic acid or an ester thereof). A condensation polymerization product obtained by a reaction of the compound a and the compound b in a molar ratio of within this range, in other words a polyamide that is a condensation polymerization product derived from a polyalkylene polyamine and a dibasic acid in a proportion of (2 moles:1 mol) to (20 moles:19 moles) on average and has a chain length of within a certain range, yields a dispersant having a high water-reducing ability and a sustained slump flow. In the case where the chain length of the polyamide is shorter than the above range (when the above reaction ratio is lower than 0.5 mol), a desired polyamide polyamine structure cannot be obtained. A chain length that is longer than the above range (when the above reaction ratio exceeds 0.95 mol) is not preferable because the water-reducing ability to be obtained significantly degrades.

The amount of alkylene oxide to be added to the polyamide polyamine is 0 to 8 moles relative to 1 equivalent of an amino residue of the polyamide polyamine. When it exceeds 8 moles, the molecular weight of the compound A increases to lead to a decrease in the cation equivalence, and therefore an effect that is adequate for the amphoteric polymer of the present invention cannot be obtained. In the present invention, addition of an alkylene oxide is preferable, and the amount thereof is preferably 0.5 to 6.0 moles and is particularly preferably 1.0 to 5.5 moles, relative to 1 equivalent of an amino residue of the polyamide polyamine.

<Polymerization Ratio>

The ratio of the components (A) to (C) involved in copolymerization is preferably (A):(B):(C)=50 to 95:5 to 50:0 to 40 by mass and is more preferably (A):(B):(C)=70 to 90:10 to 30:0 to 20 by mass.

A method for producing the copolymer of the present invention is not particularly limited, and can be a known polymerization method, such as solution polymerization and bulk polymerization, using a polymerization initiator.

The solution polymerization method can be carried out either batch-wise or continuously. Examples of the solvent to be used include water and alcohols such as methanol, ethanol, and isopropanol:aromatic or aliphatic hydrocarbons such as benzene, toluene, xylene, cyclohexane, and n-hexane; ester or ketone compounds such as ethyl acetate, acetone, and methyl ethyl ketone; cyclic ether compounds such as tetrahydrofuran and dioxanes. From the viewpoint of the solubility of a monomer as a raw material and the resulting copolymer, the solvent used is preferably at least one species selected from a group consisting of water and $C_{1-4}$ lower alcohols and is further preferably water.

When aqueous solution polymerization is carried out, a radical polymerization initiator to be used is a water-soluble polymerization initiator including persulfates such as ammonium persulfate, sodium persulfate, and potassium persulfate; hydrogen peroxide; azoamidine compounds such as 2,2'-azobis-2-methylpropionamidine hydrochloride; cyclic azoamidine compounds such as 2,2'-azobis-2-(2-imidazolin-2-yl) propane hydrochloride; and water-soluble azo compounds such as azonitrile compounds including 2-carbarnoyla-zoisobutyronitrile. An accelerator can be concurrently used therewith, and examples thereof include alkali metal sulfites such as sodium hydrogen sulfite, metabisulfites, sodium hypophosphite, Fe (II) salts such as Mohr's salt, sodium hydroxymethanesulfonate dihydrate, hydroxylamine salts, thiourea, L-ascorbic acid (salts), and erythorbic acid (salts).

A radical polymerization initiator that is used in solution polymerization using, as a solvent, a lower alcohol, an aromatic hydrocarbon, an aliphatic hydrocarbon, an ester compound, or a ketone compound is a peroxide such as benzoyl peroxide, lauroyl peroxide, and sodium peroxide; a hydroperoxide such as t-butyl hydroperoxide and cumene hydroperoxide; or an azo compound such as azobisisobutyronitrile. An accelerator such as amine compounds can be concurrently used therewith. When a mixed solvent of water and a lower alcohol is used, a radical polymerization initiator or a combination of a radical polymerization initiator and an accelerator, each of which is selected as needed from the various radical polymerization initiators and accelerators exemplified above, can be used.

When bulk polymerization is carried out, a radical polymerization initiator to be used is a peroxide such as benzoyl peroxide, lauroyl peroxide, and sodium peroxide; a hydroperoxide such as t-butyl hydroperoxide and cumene hydroperoxide; or an azo compound such as azobisisobutyronitrile.

The reaction temperature at the time of copolymerization is not particularly limited, and the appropriate range of the reaction temperature is 30 to 95° C. in the case of using a persulfate as an initiator, for example.

In copolymerization, a chain transfer agent can be used. A chain transfer agent that can be used is thiol chain transfer agents such as mercaptoethanol, thioglycerol, thioglycolic acid, 2-mercaptopropionic acid, 3-mercaptopropionic acid, thiomalic acid, octyl thioglycolate, octyl 3-mercaptopropionate, and 2-mercaptoethanesulfonic acid, and two or more of the chain transfer agents can be concurrently used.

Polymerization time at the time of copolymerization is not particularly limited, and the range thereof is appropriately 0.5 to 10 hours, is preferably 0.5 to 8 hours, and is further preferably 0.5 to 6 hours, for example. The polymerization time that is shorter or longer than the range is not preferable because it leads to degradation in a polymerization rate or degradation in productivity.

A method of dropwise addition at the time of copolymerization is not particularly limited, and examples thereof include a method of placing part or the whole of monomers into a reaction vessel, followed by adding dropwise thereto an initiator and the like, a method of placing one or more monomers into a reaction vessel, followed by adding dropwise thereto other monomers, an initiator, a chain transfer agent, and the like, a method of adding dropwise a monomer mixture, a radical polymerization initiator, and a chain transfer agent, and a method of adding dropwise a mixture of monomers and a chain transfer agent, and a radical polymerization initiator. Arranging the timing of adding each monomer considering its reactivity is generally performed.

The copolymer obtained by the above method can be used in its acidic state as a cement dispersant, and is preferably neutralized with an alkali into its salt from the viewpoint of inhibiting acid hydrolysis of the ester. Examples of the alkali include hydroxides of alkali metals and alkaline-earth metals, ammonia, mono-, di-, and tri-alkylamines (containing 2 to 8 carbon atoms), and mono-, di-, and tri-alkanolamines (containing 2 to 8 carbon atoms). A preferable copolymer of the present invention used as a cement dispersant is partly or completely neutralized. The salt of the copolymer of the present invention refers to a salt obtained by partly or completely neutralizing the acidic copolymer. The acidic copolymer includes a copolymer mixture obtained by using a partial salt of the monomer (B).

The weight average molecular weight (determined by a gel permeation chromatography method (hereinafter, called "GPC method"), in terms of polyethylene glycol) of the copolymer of the present invention as a final product is appropriately within the range of 1,000 to 100,000. When the weight average molecular weight is outside the range, the water-reducing ability to be obtained significantly degrades or a desired effect of slump loss reduction is not obtained. The weight average molecular weight is more preferably within the range of 5,000 to 30,000 for a better water-reducing ability. The molecular weight can be controlled by adjusting the species and/or the amount of the radical polymerization initiator and the like in aqueous solution polymerization. The molecular weight distribution can also be controlled by concurrently using a chain transfer agent and the like. This is speculated to have some relation with the effects of the present invention for the reason that the molecular weight distribution has been confirmed to be narrower when using the ester compound described above derived from a polyalkylene glycol alkyl ether that contains a reduced proportion of polyalkylene glycol alkyl ethers having a small number of addition moles of alkylene oxide and an unsaturated carboxylic acid. In the present invention, a term "polymer" may refer to a polymer itself alone, or may widely refer to a component including unreacted components and reaction byproducts generated in polymerization steps, a step of adding alkylene oxide, and other steps.

When a cement admixture is prepared, the cement dispersant of the present invention can be combined with suitable, known, publicly used admixtures and the like in accordance with various conditions in concrete production. Specific examples of the known, publicly used admixtures include cement dispersants other than the cement dispersant of the present invention, an air-entraining agent, a setting retarder, an accelerator, a segregation reducing agent, a thickener, an antifoaming agent, and a shrinkage reducing agent. The cement dispersant including the copolymer of the present invention encompasses both a form as a cement admixture obtained by mixing the polycarboxylic acid polymer described above and the known, publicly used admixture, and a form where the polycarboxylic acid polymer described above and the known, publicly used admixture are separately mixed in during concrete production and are eventually mixed with each other in concrete. The known, publicly used admixtures are exemplified below.

Cement dispersants are generally used in combination, as needed, in accordance with the condition of concrete production, performance requirements for concrete, and the like, and the same applies to the cement dispersant of the present invention. In addition to being used by itself as a cement dispersant or as the base material in a cement dispersant, the cement dispersant of the present invention can be used in combination with another cement dispersant to work as an auxiliary modifier when the other cement dispersant has high slump loss or as a cement dispersant having a high, early-stage water-reducing ability. Examples of the known cement dispersant other than the cement dispersant of the present invention include salts of a polycarboxylic acid copolymer described in Patent Document 1 mentioned above, Japanese Patent No. 2628486, Japanese Patent No. 2774445, Japanese Patent No. 3235002, Japanese Patent No. 3336456, Japanese Patent No. 3780456, and the like, salts of a naphthalenesulfonic acid formalin condensate, salts of a melaminesulfonic acid formalin condensate, lignin sultanate, sodium gluconate, and sugar alcohols. The formulation ratio of the cement dispersant of the present invention and the cement dispersant other than the cement dispersant of the present invention is 1:99 to 99:1% by mass.

Specific examples of the air-entraining agent include <1> anionic air-entraining agents, <2> nonionic air-entraining agents, and <3> amphoteric air-entraining agents. Examples of <1> the anionic air-entraining agents include sulfuric acid ester salts of a higher alcohol (or an alkylene oxide adduct thereof), alkylbenzenesulfonic acid salts, resin soap salts such as rosin soaps, phosphoric acid ester salts of a higher alcohol (or an alkylene oxide adduct thereof), and the like, examples of <2> the nonionic air-entraining agents include alkylene glycols, adducts of a higher alcohol with alkylene oxide, esters of a fatty acid and an alkylene glycol, adducts of a sugar alcohol with alkylene glycol, and the like, and examples of <3> the amphoteric air-entraining agents having both an anionic property and a cationic property include alkyl betaines, alkylamide betaines, amino acid amphoteric surfactants, and the like. The amount of the air-entraining agent to be added is preferably 0.001 to 0.03% by mass relative to the amount of the cement dispersant.

Examples of the setting retarder include <1> inorganic setting retarders: phosphoric acid salts, silicofluorides, zinc oxide, zinc carbonate, zinc chloride, zinc monoxide, copper hydroxide, magnesia salt, borax, and boron oxide, and <2> organic setting retarders: phosphonic derivatives, sugars and derivatives thereof, oxycarboxylic acid salts, and lignin sulfonate. In detail, examples of the phosphonic derivatives include aminotri(methylenephosphonic acid), aminotri(methylenephosphonic acid) sesquisodium salt, 1-hydroxyethylidene-1,1-diphosphonic acid, diethylenetriaminepenta(methylenephosphonic acid), and alkali metal salts and alkaline-earth metal salts of a phosphonic acid or a derivative thereof, examples of the sugars include saccharose, maltose, raffinose, lactose, glucose, fructose, mannose, arabinose, xylose, abitose, and ribose, and examples of the oxycarboxylic acid salts include gluconic acid, citric acid, glucoheptonic acid, malic acid, tartaric acid, and alkali metal salts and alkaline-earth metal salts thereof. The amount of the setting retarder to be added is preferably 0.01 to 1.5% by mass relative to the amount of a binder such as cement.

Examples of the accelerator include inorganic accelerators such as calcium chloride and calcium nitrite, and organic accelerators such as alkanolamines. The amount of the accelerator to be added is preferably 0.5 to 5% by mass relative to the amount of a binder such as cement.

Examples of the thickener and the segregation reducing agent include <1> cellulose-based water-soluble polymers including cellulose ethers (such as MC), <2> polyacrylamide-based water-soluble polymers including polyacrylamide, <3> biopolymers including curdlan and welan gum, <4> nonionic thickeners including fatty acid diesters of polyalkylene glycol and urethane condensates of polyalkylene glycol, and the like. The formulation ratio of the thickener or the segregation reducing agent to be added is preferably 0.01 to 0.5% by mass relative to the amount of the concrete composition.

Examples of the antifoaming agent include nonionic antifoaming agents such as adducts of an aliphatic alcohol with alkylene oxide, adducts of a fatty acid with alkylene oxide, alkylene oxide fatty acid diesters, adducts of a polyhydric alcohol with alkylene oxide, and adducts of a polyalkylene polyamine with alkylene oxide, silicone antifoaming agents that are emulsified silicone oils, and higher alcohols that are emulsified higher alcohols, mixture predominantly composed of these. The amount of the antifoaming agent to be added is preferably 0.001 to 1% by mass relative to the amount of the cement dispersant.

Examples of the shrinkage reducing agent include polyalkylene glycol, adducts of a lower alcohol with alkylene oxide, and emulsified products of these if they are oily. The amount thereof to be added is preferably 0.1 to 5% by mass relative to the amount of a binder such as cement.

The amount of the cement dispersant of the present invention varies depending on the formulation conditions regarding the concrete materials and the like, and is usually about 0.05 to 5.0% by mass relative to the mass of cement in terms of solid content. Although the amount needs to be as high as possible for a better water-reducing ability and a better slump flow retention to be obtained, too much cement dispersant delays setting and may lead to poor hardening. The cement dispersant of the present invention can be used in the same manner as of a common cement dispersant, and is added as it is during concrete kneading or is diluted in advance with water that is to be used later in kneading. Alternatively, the cement dispersant of the present invention may be added to kneaded concrete or mortar, followed by further kneading to homogeneity. Components other than the cement dispersant are ones that are conventionally used in concrete, and examples thereof can include cement (ordinary portland cement, high-early-strength portland cement, low/moderate heat portland cement, and blast furnace cement, for example), aggregates (that is, fine aggregates and coarse aggregates), admixtures (silica fume, calcium carbonate powder, blast furnace slag powder, for example), expansive agents, and water. Examples of admixtures, other than the cement dispersant of the present invention, that can be added separately at the time of formulation include an air-entraining agent, a setting retarder, an accelerator, a segregation reducing agent, a thickener, an antifoaming agent, and a shrinkage reducing agent, that are known and are publicly used, and these can also be formulated, as needed. The formulation ratio of each component can be determined, as needed, in accordance with the species and the intended use of the selected component.

EXAMPLES

The present invention will be described in more detail by examples. The scope of the present invention is, however, not limited to these examples. The value % shown below is % by mass unless otherwise specified.

<Measurement Condition in Gas Chromatography (GC)>
Device: GC-2010, AOC-20i (manufactured by SHIMADZU CORPORATION)
Column: DB-1701 (manufactured by J&W Scientific Inc.), length: 30.0 m, column oven: 170° C.,
Carrier gas: He, total flow: 33.3 ml/min, injection amount: 0.8 μL
Temperature raising rate: 10° C./min, holding temperature/time: 170° C./17 min, 220° C./5 min, 280° C./15 min
Detector: FID, detector temperature: 300° C., temperature in vaporizing chamber: 280° C., air flow rate: 400 ml/min, hydrogen flow rate: 40 ml/min <Measurement Condition in Liquid Chromatography (LC)>
Device: LC20A (manufactured by SHIMADZU CORPORATION)
Column: ODS column manufactured by Tosoh Corporation
Mobile phase: water/methanol=80/20 to 50/50 (vol %)
Detector: RID
<Measurement Condition in Gel Permeation Chromatography (GPC)>
Column: OHpak SB-802.5HQ, OHpak SB-803HQ, OHpak SB-804HQ (manufactured by Showa Denko K. K.)
Eluting solution: a mixed solution of a 50 mM aqueous sodium nitrate solution and acetonitrile (volume ratio: 80/20)
Detector: a differential refractometer, calibration curve: polyethylene glycol
<Production of Polyethylene Glycol Monomethyl Ether>

Synthesis Example 1

140 parts of methanol was placed in a stainless steel autoclave equipped with a nitrogen inlet tube and an ethylene oxide inlet tube, and thereto 0.10 parts of sodium methoxide was added. The system was replaced with nitrogen, and thereto 545 parts of ethylene oxide was introduced at a reaction temperature of 120° C., followed by aging at 125° C. for 45 minutes to obtain 678 parts of a solution of synthesized polyethylene glycol monomethyl ether. The solution was distilled to remove a fraction having 3 moles or less of ethylene oxide, and a compound a1 was obtained. GC measurement was performed to show that the compound contained 0.5% of polyethylene glycol monomethyl ether having 3 moles or less of ethylene oxide. The average molecular weight was 230.

Comparative Synthesis Example

Using the same device and under the same reaction condition as in Synthesis Example 1, 112 parts of methanol, 0.10 parts of sodium methoxide, and 573 parts of ethylene oxide were introduced to obtain 680 parts of a solution of synthesized polyethylene glycol monomethyl ether x1. GC measurement was performed to show that the compound contained 32.8% of polyethylene glycol monomethyl ether having 3 moles or less of ethylene oxide. The average molecular weight was 230.

In the same manner as in x1, polyethylene glycol monomethyl ether x2 (average molecular weight: 400) and polyethylene glycol monomethyl ether x3 (average molecular weight: 1,000) were obtained.

Synthesis Example 2

Addition of ethylene oxide to the compound a1 was performed in the same device using sodium methoxide as a catalyst to obtain polyethylene glycol monomethyl ether a2. The hydroxyl value of the compound was measured to calculate the molecular weight of the compound to be 400.

FIG. 1 shows LC analysis results of the distribution of the number of addition moles of ethylene oxide in the polyethylene glycol monomethyl ether x2 synthesized in Comparative Synthesis Example and the polyethylene glycol monomethyl ether a2 synthesized in Synthesis Example 2, both of which had the same average molecular weight.

As shown in FIG. 1, it was confirmed that the distribution in the polyethylene glycol monomethyl ether a2 was narrower and sharper than that of the polyethylene glycol monomethyl ether x2.

Synthesis Example 3

Synthesis was performed using the same ratio of methanol and ethylene oxide, the same device, and the same reaction condition, as in Synthesis Example 1, followed by distillation of the resultant to obtain a compound a3. The resultant contained 3.6% of the constituent having 3 moles or less of ethylene oxide, and the average molecular weight thereof measured by GC was 230.

<Production of Component (A)>

The polyethylene glycol monomethyl ether (a1 to a3, x1 to x3) obtained in either of Synthesis Examples 1 to 3 and Comparative Synthesis Example was subjected to dehydration and esterification with acrylic acid or methacrylic acid by a conventional procedure to obtain a methacrylic acid ester or an acrylic acid ester of the polyethylene glycol monomethyl ether.

Table I shows acrylic acid esters and methacrylic acid esters of the polyethylene glycol monomethyl ether to be used later in the polymer production.

<Production of Another Copolymerizable Monomer (C)>

Synthesis Example 4

Synthesis of Monomers C1 and C2

Addition of ethylene oxide to methanol was performed in the same device as in Synthesis Example 1 using sodium methoxide as a catalyst to obtain polyethylene glycol monomethyl ethers (molecular weight: 1,000 and 2,000).

The resultants were subjected to dehydration and esterification with methacrylic acid by a conventional procedure to obtain methoxypolyethylene glycol methacrylates (monomers C1 and C2).

Synthesis Example 5

Synthesis of Monomer C3

Polyethylene glycol monomethyl ether with a molecular weight of 4,000 was subjected to dehydration and esterification with methacrylic acid by a conventional procedure to obtain methoxypolyethylene glycol methacrylate (monomer C3).

Synthesis Example 6

Synthesis of Monomer C4

250 parts of a polyalkylene polyamine "Poly-8" (manufactured by Tosoh Corporation) and 86 parts of adipic acid were placed in a reaction vessel equipped with a stirrer, followed by mixing with stirring in a nitrogen atmosphere created by nitrogen introduction. The temperature was raised to 150° C., and a reaction was allowed to proceed for 20 hours while releasing a dehydrate that generated during the condensation polymerization reaction to the outside the reaction system until the acid value reached 18. 1.7 parts of hydroquinone methyl ether and 2.5 parts of methacrylic acid were then added, and the reaction was allowed to proceed at the same temperature for 10 hours. Then, 318 parts of a polyimide polyamine was obtained along with 21 parts in total of water as distillate. The polyamide polyamine as a whole was dissolved in 414 parts of water, and the temperature was raised to 50° C. 239 parts of ethylene oxide was successively introduced thereto at the same temperature over 2 hours, followed by aging for 2 hours to obtain 971 parts of a desired product, namely an adduct of the polyamide polyamine with ethylene oxide (monomer C4).

(Monomer C5)

An adduct of 3-methyl-3-buten-1-ol with ethylene oxide (molecular weight: 1,200) was used as a monomer C5.

<Preparation of Copolymers P1 to P9 and Q1 to Q4>

Production Example 1

Preparation of Copolymer P1

330 parts of water was placed in a reaction vessel equipped with a nitrogen inlet tube, a stirrer, and a thermometer, and nitrogen was introduced thereto to create a nitrogen atmosphere inside the reaction vessel, followed by raising the temperature to 80° C. To the reaction vessel, three kinds of solutions, that is, a mixed solution of 308 parts of a methacrylic acid ester of the polyethylene glycol monomethyl ether a1 and 76.8 parts of methacrylic acid dissolved in 87 parts of water, 63 parts of a 10% aqueous thioglycolic acid solution, and 81 parts of a 10% aqueous sodium persulfate solution, were added dropwise over 3 hours. After the completion of dropwise addition, aging was allowed to proceed at the same temperature for 2 hours. The resulting compound was neutralized with sodium hydroxide to obtain 984 parts of a copolymer P1. GPC measurement was performed to show the weight average molecular weight (Mw) of the compound to be 6,800.

In the same steps as in the preparation of the copolymer P1, copolymers P2 to P9 and comparative copolymers Q1 to Q4 each having a composition listed in Table 1 were obtained. The numbers in parentheses in the columns of component (A) in Table 1 indicate a mass proportion of a (meth)acrylic acid ester of methoxypolyethylene glycol used in the component (A).

TABLE 1

Composition and weight average molecular weight of copolymers

| | Component (A) | | | Component | | |
| --- | --- | --- | --- | --- | --- | --- |
| | Acrylic acid ester | Methacrylic acid ester | Component (B) | (C) (monomer) | Copolymerization ratio (A)/(B)/(C) | Mw |
| Copolymer P1 | — | a1 (100) | Methacrylic acid | — | 80/20/0 | 6,800 |
| Copolymer P2 | — | a1/a2 (50/50) | Methacrylic acid | — | 77/23/0 | 7,200 |
| Copolymer P3 | — | a1 (100) | Methacrylic acid | C1 | 65/15/20 | 8,500 |
| Copolymer P4 | a1 (100) | — | Methacrylic | C1/C4 | 80/10/10 | 18,000 |

TABLE 1-continued

Composition and weight average molecular weight of copolymers

| | Component (A) | | Component (B) | Component (C) (monomer) | Copolymerization ratio (A)/(B)/(C) | Mw |
|---|---|---|---|---|---|---|
| | Acrylic acid ester | Methacrylic acid ester | | | | |
| Copolymer P5 | a1/a2 (30/20) | — | Methacrylic acid | C1/C2/C4 (50/40/10) (75/25) | 51/9/40 | 24,000 |
| Copolymer P6 | — | a2 (100) | Methacrylic acid | — | 80/20/0 | 7,800 |
| Copolymer P7 | — | a3 (100) | Methacrylic acid | — | 80/20/0 | 7,000 |
| Copolymer P8 | a1/a2 (50/50) | — | Methacrylic acid | C1/C3 (33/67) | 55/5/40 | 16,000 |
| Copolymer P9 | a1/a2 (80/20) | — | Acrylic acid | C5 | 53/7/40 | 15,000 |
| Comparative copolymer Q1 | — | x1 (100) | Methacrylic acid | — | 80/20/0 | 8,300 |
| Comparative copolymer Q2 | — | x1/x2 (50/50) | Methacrylic acid | — | 77/23/0 | 9,100 |
| Comparative copolymer Q3 | — | x2 (100) | Methacrylic acid | — | 80/20/0 | 8,800 |
| Comparative copolymer Q4 | — | x3 (100) | Methacrylic acid | — | 80/20/0 | 9,700 |

<Fresh Concrete Testing>

Using the copolymers P1 to P9 and the comparative copolymers Q1 to Q4 obtained in Production Examples, fresh concrete testing was performed employing the concrete formulation listed in Table 2. Kneading of concrete was performed in a 55-liter forced twin-shaft mixer by adding a mixture of each copolymer (P1 to P9, Q1 to Q4) and water prepared in advance to a coarse aggregate, cement, and a fine aggregate, and the resultant was kneaded for a predetermined period of time. The kneading time was the duration between the beginning of kneading and the point when visual observation confirmed that the materials had adequately blended with each other to form concrete, and is listed in Table 4 as "Kneading time" for each polymer used.

Subsequently, right after discharging concrete, the fresh concrete testing was performed, and it consisted of a slump test in accordance with JIS A 1101 (measuring the spread of fresh concrete to use as a flow value), measurement of air content in accordance with JIS A 1128, a setting performance test (the setting start time corresponded to the time when the penetration resistance of mortar reached 3.5 N/mm$^2$), and evaluation of concrete viscosity (right after discharge and 30 minutes later).

The slump test was performed not only at normal temperature (20° C.) but also at 30° C., and the copolymer was added in the same proportion at each temperature. A sample showing not larger than 2.5 cm of an initial slump variation due to increased temperature of concrete can be evaluated as excellent, a sample showing that of larger than 2.5 cm and not larger than 3.5 cm can be evaluated as average, and a sample showing that of larger than 3.5 cm can be evaluated as unacceptable.

The results obtained are listed in Table 4.

Evaluation of concrete viscosity was performed by sensory evaluation (lightweight feeling at the time of kneading) including evaluation of ease of handling during shovel work and the texture at the time of kneading in accordance with the following criterion because no unified evaluation method had yet been established in the industry.

⊚: The texture at the time of kneading was light and concrete was glossy. The slump flow further increased with a little vibration added.

○: The evaluation was a little inferior to the evaluation ⊚, but handling was easy and concrete was glossy.

Δ: The evaluation was inferior to the evaluation ○, but concrete was glossy.

x: The texture at the time of kneading was heavy and concrete had some rough texture.

<Evaluation of Appearance>

A columnar specimen with ϕ100×200 mm was prepared using the concrete produced in <Fresh concrete testing>. After hardened, the columnar specimen was released from a mold, and the proportion of area of pockmarks on the side surface of the specimen was determined, which was used as an indicator of appearance evaluation. A proportion of area of pockmarks of not higher than 3% can be evaluated as low, that of higher than 3% and not higher than 4% can be evaluated as average, and that of higher than 4% can be evaluated as high. A sample that is lower in the proportion of area of pockmarks can be evaluated to be excellent in an effect of improving concrete appearance.

The results obtained are listed in Table 4.

<Evaluation of Mortar Viscosity>

(Viscosity Evaluation A: Flow-Off Time Measurement)

A funnel with a bottom lid and having an upper inner diameter ϕ70 mm, a lower inner diameter ϕ25 mm, and a height of 250 mm was filled with a mortar prepared by employing the formulation in Table 3. The time elapsed after the lid was removed and before the mortar completely flowed off was measured. A flow-off time was measured. A sample showing a shorter flow-off time can be evaluated to be excellent in construction workability. The results obtained are listed in Table 4.

(Viscosity Evaluation B: Measurement of Flow After 5 Times of Impact)

A mini slump cone with an upper inner diameter ϕ50 mm, a lower inner diameter ϕ100 mm, and a height of 150 mm was filled with the mortar, and, on a flow table that is used in a flow test defined in JIS R 5201, the cone was lifted to measure the slump of the mortar (a sample showing a slump of about 10 cm was used in the subsequent test). Subsequently, the slump flow of the mortar after striking the flow table 5 times was measured. The results obtained are listed in Table 4.

A sample showing a higher value of flow after 5 times of impact at the same slump value can be evaluated to be higher in deformability against a load, namely having lower viscosity. For the usefulness of viscosity evaluation by measuring flow after 5 times of impact, see MORI HIROSHI, TANIGAWA YASUO: RHEOLOGICAL DISCUSSIONS OF VARIOUS CONSISTENCY TESTS OF FRESH CONCRETE, Architectural Institute of Japan, Journal of Structural and Construction Engineering, No. 377, pp. 16-26, 1987. 7.

Table 2 shows the concrete formulation, Table 3 shows the mortar formulation, and Table 4 shows the results of fresh concrete testing.

TABLE 2

Concrete formulation

| W/C (%) | s/a | Unit amount (kg/m³) | | | |
|---|---|---|---|---|---|
| | | Water | Cement | Fine aggregate | Coarse aggregate |
| 45 | 47.2 | 160 | 356 | 844 | 972 |

Cement: ordinary portland cement (manufactured by TAIHEIYO CEMENT CORPORATION, density: 3.16 g/cm³)
Fine aggregate: land sand (produced in Kimitsu, Chiba, density: 2.62 g/cm³)
Coarse aggregate: crushed lime stone (produced in Mine, Yamaguchi, density: 2.70 g/cm³)
Designed air content: 4.5 ± 1.5 vol %

TABLE 3

Mortar formulation

| W/C (%) | S/C | Unit amount (kg/L) | | |
|---|---|---|---|---|
| | | Water | Cement | Fine aggregate |
| 45 | 2.57 | 252 | 561 | 1441 |

Cement: ordinary portland cement (manufactured by TAIHEIYO CEMENT CORPORATION, density: 3.16 g/cm³)
Fine aggregate: land sand (produced in Kimitsu, Chiba, density: 2.62 g/cm³)
Designed air content: not higher than 2%

As listed in Table 3, it was confirmed that Example 1 to Example 9 in which the copolymers P1 to P9 of the present invention were used provided excellent water-reducing ability, caused no delay in setting, and achieved low viscosities of fresh concrete to allow easy kneading.

In contrast to this, Comparative Example 1 to Comparative Example 4 in which the comparative copolymers Q1 to Q4 were used were a little inferior in water-reducing ability and setting time, and were high in fresh concrete viscosity, especially in the viscosity of 30 minutes later, showing poorer workability.

The invention claimed is:

1. A copolymer resulting from a reaction of components (A) to (C):
   (A) an ester compound obtained by adding 0 to 10 moles of $C_{2-4}$ alkylene oxide to 1 mole of at least one compound of Formula (1):

$$RO\text{-}(AO)n\text{-}H \qquad (1)$$

where R is a $C_{1-12}$ alkyl group, A is a $C_{2-4}$ alkylene group, and n is an integer of 0 to 7 indicating the number of addition moles of alkylene oxide, and then subjecting the resulting adduct to a reaction with an $\alpha,\beta$-unsaturated carboxylic acid, in which the compound of Formula (1) contains not more than 5% by mass of the constituent compounds having n of 3 or less relative to the total mass of the compound of Formula (1),
   (B) an $\alpha,\beta$-unsaturated carboxylic acid or a salt thereof, and
   (C) optionally another copolymerizable monomer; or a salt thereof.

2. A copolymer resulting from a reaction of components (A) to (C):

TABLE 4

Test results

| | Co-polymer used | Proportion*1 | Kneading time (seconds) | Slump (cm) | 30° C. | Slump flow (cm) | Air content (vol %) | Viscosity | 30 minutes later | Setting hour-minute | Appearance Proportion of area of pockmarks (%) | Flow-off time (second) | Evaluation of mortar viscosity Mini-slump (cm) | Flow after 5 times of impact (cm) |
|---|---|---|---|---|---|---|---|---|---|---|---|---|---|---|
| Ex. 1 | P1 | 0.26 | 60 | 21.0 | 18.5 | 41.5 × 41.0 | 4.8 | ◉ | ○ | 6-24 | 2.7 | 3.1 | 10.0 | 237 |
| Ex. 2 | P2 | 0.25 | 60 | 20.5 | 18.0 | 40.0 × 39.5 | 4.9 | ◉ | ◉ | 6-57 | 2.4 | 2.8 | 9.5 | 242 |
| Ex. 3 | P3 | 0.24 | 75 | 20.0 | 17.5 | 38.5 × 38.5 | 4.6 | ○ | ○ | 6-36 | 1.9 | 3.2 | 10.0 | 244 |
| Ex. 4 | P4 | 0.23 | 60 | 21.5 | 19.0 | 41.5 × 40.5 | 4.5 | ◉ | ◉ | 6-52 | 2.1 | 3.5 | 10.5 | 245 |
| Ex. 5 | P5 | 0.21 | 75 | 21.0 | 18.0 | 38.0 × 37.5 | 4.3 | ○ | ◉ | 6-41 | 2.8 | 3.7 | 10.0 | 230 |
| Ex. 6 | P6 | 0.24 | 60 | 20.5 | 17.5 | 39.0 × 38.5 | 4.8 | ◉ | ◉ | 6-37 | 2.5 | 4.0 | 10.0 | 240 |
| Ex. 7 | P7 | 0.25 | 75 | 19.5 | 16.0 | 37.0 × 37.0 | 4.4 | ○ | ○ | 6-51 | 3.0 | 3.7 | 9.5 | 233 |
| Ex. 8 | P8 | 0.23 | 60 | 19.5 | 16.5 | 37.5 × 37.0 | 4.6 | ○ | ○ | 6-38 | 2.8 | 4.3 | 9.5 | 230 |
| Ex. 9 | P9 | 0.22 | 60 | 21.0 | 18.0 | 40.0 × 39.0 | 4.4 | ○ | ○ | 6-31 | 3.1 | 4.1 | 10.0 | 228 |
| Comp. Ex. 1 | Q1 | 0.27 | 90 | 20.5 | 14.5 | 36.5 × 35.5 | 4.3 | Δ | x | 7-17 | 5.3 | 5.1 | 9.5 | 212 |
| Comp. Ex. 2 | Q2 | 0.26 | 90 | 20.5 | 15.5 | 37.0 × 37.0 | 4.6 | Δ | Δ | 7-46 | 4.9 | 5.5 | 10.0 | 219 |
| Comp. Ex. 3 | Q3 | 0.25 | 90 | 20.0 | 16.0 | 36.0 × 35.5 | 4.2 | Δ | x | 7-22 | 4.6 | 5.4 | 9.5 | 214 |
| Comp. Ex. 4 | Q4 | 0.24 | 75 | 19.5 | 16.0 | 37.5 × 37.0 | 4.5 | x | x | 7-05 | 5.9 | x*2 | 9.5 | 204 |

*1 The addition amount (solid content) of a copolymer relative to the mass of cement: % by mass
*2 Mortar that was filled did not completely flow off and therefore measurement was impossible.

(A) at least one ester compound of Formula (2):

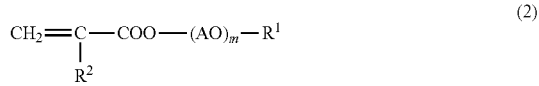 (2)

where $R^1$ is a $C_{1-12}$ alkyl group, $R^2$ is a hydrogen atom or a methyl group, A is a $C_{2-4}$ alkylene group, and m is an integer of 0 to 15 indicating the number of addition moles of alkylene oxide, in which the compound contains not more than 5% by mass of the constituent compounds having m of 3 or less relative to the total mass of the compound, and an average calculated from m values of each ester compound of Formula (2) of component (A) is 4.0 to 8.5, (B) an α,β-unsaturated carboxylic acid or a salt thereof, and (C) optionally another copolymerizable monomer;
or a salt thereof.

3. The copolymer or a salt thereof according to claim 1, wherein the ratio of the components (A) to (C) involved in copolymerization is (A):(B):(C)=50 to 95:5 to 50:0 to 40 by mass.

4. The copolymer or a salt thereof according to claim 2, wherein the ratio of the components (A) to (C) involved in copolymerization is (A):(B):(C)=50 to 95:5 to 50:0 to 40 by mass.

5. A dispersant comprising the copolymer or a salt thereof as claimed in claim 1.

6. A cement dispersant comprising the copolymer or a salt thereof as claimed in claim 1.

7. A dispersant comprising the copolymer or a salt thereof as claimed in claim 2.

8. A dispersant comprising the copolymer or a salt thereof as claimed in claim 3.

9. A dispersant comprising the copolymer or a salt thereof as claimed in claim 4.

10. A cement dispersant comprising the copolymer or a salt thereof as claimed in claim 2.

11. A cement dispersant comprising the copolymer or a salt thereof as claimed in claim 3.

12. A cement dispersant comprising the copolymer or a salt thereof as claimed in claim 4.

\* \* \* \* \*